US011438153B2

(12) United States Patent
Zheng

(10) Patent No.: US 11,438,153 B2
(45) Date of Patent: Sep. 6, 2022

(54) METHOD AND DEVICE FOR TRANSMITTING DATA

(71) Applicant: SHANGHAI SHANGWANG NETWORK TECHNOLOGY CO., LTD., Shanghai (CN)

(72) Inventor: Xiaoping Zheng, Shanghai (CN)

(73) Assignee: SHANGHAI SHANGWANG NETWORK TECHNOLOGY CO., LTD., Shanghai (CN)

( * ) Notice: Subject to any disclaimer, the term of this patent is extended or adjusted under 35 U.S.C. 154(b) by 98 days.

(21) Appl. No.: 16/686,698

(22) Filed: Nov. 18, 2019

(65) Prior Publication Data

US 2020/0092093 A1    Mar. 19, 2020

Related U.S. Application Data

(63) Continuation of application No. PCT/CN2018/087230, filed on May 17, 2018.

(30) Foreign Application Priority Data

May 18, 2017 (CN) .......................... 201710350737.X

(51) Int. Cl.
*H04L 9/08* (2006.01)
*H04L 9/06* (2006.01)
*H04L 9/40* (2022.01)
*H04W 12/63* (2021.01)

(52) U.S. Cl.
CPC .......... *H04L 9/0872* (2013.01); *H04L 9/0618* (2013.01); *H04L 9/0819* (2013.01); *H04L 9/0866* (2013.01); *H04L 63/0428* (2013.01); *H04W 12/63* (2021.01)

(58) Field of Classification Search
USPC ........ 713/153, 150, 163, 181; 726/2, 21, 36; 380/255, 264, 276
See application file for complete search history.

(56) References Cited

U.S. PATENT DOCUMENTS

| | | | | |
|---|---|---|---|---|
| 4,881,263 A * | 11/1989 | Herbison | ................ | H04L 9/083 380/43 |
| 5,235,644 A * | 8/1993 | Gupta | ..................... | H04L 29/02 713/161 |
| 7,879,111 B2 * | 2/2011 | Hardacker | ............ | H04W 12/04 380/52 |
| 9,519,696 B1 * | 12/2016 | Roth | ..................... | G06F 16/258 |

(Continued)

*Primary Examiner* — Sharif E Ullah
(74) *Attorney, Agent, or Firm* — Bayramoglu Law Offices LLC

(57) ABSTRACT

A method for transmitting data includes: obtaining original data to be encrypted on a network device; determining a decryption geographic location of the original data to be encrypted, and selecting a hotspot within a range of the decryption geographic location; afterwards, using attribute information of the selected hotspot as an encryption key to encrypt the original data to be encrypted, and obtaining ciphertext data and sending the ciphertext data to user equipment. The attribute information is available to the user equipment by the user equipment scanning the hotspot within the range of the decryption geographic location. The present disclosure realizes encryption of the original data based on an actual decryption geographic location which is used as the encryption key of the original data to be encrypted.

10 Claims, 6 Drawing Sheets

(56) References Cited

U.S. PATENT DOCUMENTS

| | | | |
|---|---|---|---|
| 10,318,754 B2* | 6/2019 | Yavuz | G06F 21/6227 |
| 10,331,895 B1* | 6/2019 | Roth | G06F 21/6209 |
| 10,333,696 B2* | 6/2019 | Ahmed | H04L 9/006 |
| 10,361,859 B2* | 7/2019 | Clark | G06F 16/182 |
| 10,917,230 B2* | 2/2021 | Feng | G06F 21/53 |
| 2003/0196115 A1* | 10/2003 | Karp | H04L 63/0236 |
| | | | 709/227 |
| 2019/0109713 A1* | 4/2019 | Clark | H04L 9/3239 |

* cited by examiner

METHOD AND DEVICE FOR TRANSMITTING DATA

CROSS REFERENCE TO THE RELATED APPLICATIONS

This application is the continuation application of International Application No. PCT/CN2018/087230, filed on May 17, 2018, which is based upon and claims priority to Chinese Patent Application No. 201710350737.X, filed on May 18, 2017, the entire contents of which are incorporated herein by reference.

TECHNICAL FIELD

The present disclosure relates to the field of computers. More specifically, the present disclosure relates to a method and a device for transmitting data.

BACKGROUND

In the prior art, the data transmission process is based on a predetermined procedure, and data information is sent to a terminal device of a user through a single link or multiple links. Intending to ensure the security of data during the data transmission process, the prior art performs encryption on the data to be transmitted to obtain an encrypted data packet and then the encrypted data packet is sent to the terminal device of the user. Subsequently, the terminal device of the user decrypts the encrypted data packet based on a preset decryption algorithm, thereby obtaining the transmitted original data, and ensuring the security of data in the transmission process. However, in the prior art, some illegal users hack into the data transmission channel and intercept the encrypted data packet and the decryption algorithm, so as to obtain the original data in the transmission process with the aid of the illegally obtained encrypted data and the decryption algorithm, thereby posing a potential security issue and a risk of data breach during the transmission process.

SUMMARY

An objective of the present disclosure is to provide a method and a device for transmitting data to solve the problem of the potential security issue and risk of data leakage in the data transmission process in the prior art.

According to the first aspect of the present disclosure, the present disclosure provides a method for transmitting data on a network device, the method includes:

obtaining original data to be encrypted;

determining a decryption geographic location of the original data to be encrypted, and selecting a hotspot within a range of the decryption geographic location; and using attribute information of the selected hotspot as an encryption key, encrypting the original data to be encrypted to obtain ciphertext data, and sending the ciphertext data to user equipment, wherein the attribute information is available to the user equipment by the user equipment scanning the hotspot within the range of the decryption geographic location.

Further, in the above-mentioned method, the attribute information includes a physical address of the selected hotspot.

Further, in the above-mentioned method, the attribute information includes a physical address of the selected hotspot and the user identification information of the user equipment to which the selected hotspot belongs.

Further, in the above-mentioned method, the step of determining the decryption geographic location of the original data to be encrypted includes:

determining a geographic location within a preset distance from a current geographic location of the user equipment as the decryption geographic location of the original data to be encrypted; or determining the decryption geographic location of the original data to be encrypted according to a historical geographic movement track of the user equipment.

Further, in the above-mentioned method, when the original data to be encrypted is encrypted to obtain the ciphertext data and the ciphertext data is sent to the user equipment, the method further includes:

sending a hotspot name corresponding to the selected hotspot to the user equipment.

Further, in the above-mentioned method, the step of using the attribute information of the selected hotspot as the encryption key, encrypting the original data to be encrypted to obtain the ciphertext data, and sending the ciphertext data the user equipment includes:

using the attribute information corresponding to the selected hotspot as the encryption key, encrypting the original data to be encrypted based on the preset encryption algorithm and the encryption key to obtain the ciphertext data, and sending the ciphertext data to the user equipment.

Further, in the above-mentioned method, the original data includes at least one of the following:

relevant data information of the hotspot;

user attribute information of the user equipment; and business data information stored in the network device.

Further, in the above-mentioned method, when the original data to be encrypted is encrypted to obtain the ciphertext data and the ciphertext data is sent to the user equipment, the method further includes:

sending the preset decryption algorithm to the user equipment.

According to the second aspect of the present disclosure, the present disclosure further provides a method for transmitting data on the network device, wherein the method includes:

obtaining a data query request sent by the user equipment, wherein the data query request includes the attribute information of the selected hotspot scanned and obtained by the user equipment within a range of a current decryption geographic location; and obtaining the original data to be encrypted based on the data query request, using the attribute information of the selected hotspot as the encryption key to encrypt the original data, obtaining the ciphertext data, and sending the ciphertext data to the user equipment.

According to the third aspect of the present disclosure, the present disclosure further provides a method for obtaining data on the user equipment, wherein the method includes:

receiving ciphertext data sent by the network device;

obtaining attribute information of the hotspot scanned within the range of the decryption geographic location; and using the attribute information of the scanned hotspot as an encryption key, and decrypting the ciphertext data to obtain the original data.

Further, in the above-mentioned method, the attribute information includes a physical address of the selected hotspot.

Further, in the above-mentioned method, the attribute information includes a physical address of the selected hotspot and user identification information of the user equipment to which the selected hotspot belongs.

Further, in the above-mentioned method, the decryption geographic location includes:

a geographic location of the user equipment after the user equipment moves a preset distance; and a geographic location in the historical geographic movement track of the user equipment.

Further, in the above-mentioned method, when the ciphertext data sent by the network device is received, the method further includes:

receiving a hotspot name sent by the network device; and the step of using the attribute information of the scanned hotspot as the encryption key and decrypting the ciphertext data to obtain the original data includes:

using the attribute information corresponding to the hotspot name in the attribute information of the scanned hotspot as the encryption key, and decrypting the ciphertext data to obtain the original data.

Further, in the above-mentioned method, before the attribute information of the scanned hotspot is used as the encryption key, and the ciphertext data is decrypted to obtain the original data, the method further includes:

receiving the decryption algorithm sent by the network device; and the step of using the attribute information of the scanned hotspot as the encryption key and decrypting the ciphertext data to obtain the original data includes:

using the attribute information of the scanned hotspot as the encryption key, and decrypting the ciphertext data based on the received decryption algorithm and the encryption key to obtain the original data.

Further, in the above-mentioned method, the original data includes at least one of the following:

the relevant data information of the hotspot;

the user attribute information of the user equipment; and the business data information stored in the network device.

According to the fourth aspect of the present disclosure, the present disclosure further provides a method for obtaining data on user equipment, wherein the method includes:

determining a current actual geographic location as a current decryption geographic location, scanning and selecting a hotspot within the range of the current decryption geographic location, and obtaining the attribute information of the selected hotspot;

sending a data query request to the network device based on the attribute information of the selected hotspot;

receiving ciphertext data returned by the network device based on the data query request; and using the attribute information of the scanned selected hotspot as the encryption key to decrypt the ciphertext data, obtaining the original data.

According to the fifth aspect of the present disclosure, the present disclosure further provides a network device for transmitting data, wherein the network device includes:

a data acquisition device, configured to obtain the original data to be encrypted;

a determining device, configured to determine the decryption geographic location of the original data to be encrypted, and select the hotspot within the range of the decryption geographic location;

an encryption device, configured to use the attribute information of the selected hotspot as the encryption key, encrypt the original data to be encrypted to obtain the ciphertext data, and send the ciphertext data to the user equipment, wherein the attribute information is available to the user equipment by the user equipment scanning the hotspot within the range of the decryption geographic location.

Further, in the above-mentioned network device, the attribute information includes a physical address of the selected hotspot.

Further, in the above-mentioned network device, the attribute information includes a physical address of the selected hotspot and the user identification information of the user equipment to which the selected hotspot belongs.

Further, in the above-mentioned network device, the determining device is configured to:

determine the geographic location within the preset distance from the current geographic location of the user equipment as the decryption geographic location of the original data to be encrypted; or determine the decryption geographic location of the original data to be encrypted according to the historical geographic movement track of the user equipment.

Further, in the above-mentioned network device, the encryption device is configured to:

send the hotspot name corresponding to the selected hotspot to the user equipment.

Further, in the above-mentioned network device, the encryption device is configured to:

use the attribute information corresponding to the selected hotspot as the encryption key; encrypt the original data to be encrypted based on the preset encryption algorithm and the encryption key to obtain the ciphertext data; and send the ciphertext data to the user equipment.

Further, in the above-mentioned network device, the original data includes at least one of the following:

the relevant data information of the hotspot;

the user attribute information of the user equipment; and the business data information stored in the network device.

Further, in the above-mentioned network device, the encryption device is configured to:

send the preset decryption algorithm to the user equipment.

According to the sixth aspect of the present disclosure, the present disclosure further provides a network device for transmitting data, wherein the network device includes:

a request acquisition device, configured to obtain the data query request sent by the user equipment, wherein the data query request includes the attribute information of the selected hotspot scanned and obtained by the user equipment within the range of the current decryption geographic location; and a ciphertext data transmitting device, configured to obtain the original data to be encrypted based on the data query request; use the attribute information of the selected hotspot as the encryption key to encrypt the original data to be encrypted; and obtain the ciphertext data and send the ciphertext data to the user equipment.

According to the seventh aspect of the present disclosure, the present disclosure further provides user equipment for obtaining data, wherein the user equipment includes:

a receiving device, configured to receive the ciphertext data sent by the network device;

an information acquisition device, configured to obtain the attribute information of the hotspot scanned within the range of the decryption geographic location; and a decryption device, configured to use the attribute information of the scanned hotspot as the encryption key to decrypt the ciphertext data, and obtain the original data.

Further, in the above-mentioned user equipment, the attribute information includes a physical address of the selected hotspot.

Further, in the above-mentioned user equipment, the attribute information includes a physical address of the selected hotspot and the user identification information of the user equipment to which the selected hotspot belongs.

Further, in the above-mentioned user equipment, the decryption geographic location includes:

a geographic location of the user equipment after the user equipment moves the preset distance; and a geographic location in the historical geographic movement track of the user equipment.

Further, in the above-mentioned user equipment, the receiving device is configured to:

receive the hotspot name sent by the network device; and the decryption device configured to use the attribute information of the scanned hotspot as the encryption key, and decrypt the ciphertext data to obtain the original data, is further configured to:

use the attribute information corresponding to the hotspot name in the attribute information of the scanned hotspot as the encryption key, and decrypt the ciphertext data to obtain the original data.

Further, in the above-mentioned user equipment, the receiving device is configured to:

receive the decryption algorithm sent by the network device; and the decryption device configured to use the attribute information of the scanned hotspot as the encryption key, and decrypt the ciphertext data to obtain the original data is further configured to:

use the attribute information of the scanned hotspot as the encryption key, and decrypt the ciphertext data based on the received decryption algorithm and the encryption key, and obtain the original data.

Further, in the above-mentioned user equipment, the original data includes at least one of the following:

the relevant data information of the hotspot;

the user attribute information of the user equipment; and the business data information stored in the network device.

According to the eighth aspect of the present disclosure, the present disclosure further provides user equipment for obtaining data, wherein the user equipment includes:

a determining acquisition device, configured to determine the current actual geographic location as the current decryption geographic location; scan and select the hotspot within the range of the current decryption geographic location; and obtain the attribute information of the selected hotspot;

a request transmitting device, configured to send the data query request to the network device based on the attribute information of the selected hotspot;

a ciphertext data receiving device, configured to receive ciphertext data returned by the network device based on the data query request;

a decryption acquisition device, configured to use the attribute information of the scanned selected hotspot as the encryption key to decrypt the ciphertext data, and obtain the original data.

According to the ninth aspect of the present disclosure, the present disclosure further provides a computing-based device, wherein the computing-based device includes:

a processor; and a memory configured to store computer executable instructions, and wherein the executable instructions are executed to allow the processor to:

obtain original data to be encrypted;

determine the decryption geographic location of the original data to be encrypted, and select the hotspot within the range of the decryption geographic location; and use the attribute information of the selected hotspot as the encryption key, and encrypt the original data to be encrypted to obtain ciphertext data and send the ciphertext data to the user equipment, wherein the attribute information is available to the user equipment by the user equipment scanning the hotspot within the range of the decryption geographic location.

According to the tenth aspect of the present disclosure, the present disclosure further provides a computing-based device, wherein the computing-based device includes:

a processor; and a memory configured to store computer executable instructions, and the executable instructions are executed to allow the processor to:

obtain a data query request sent by the user equipment, wherein the data query request includes the attribute information of the selected hotspot scanned and obtained by the user equipment within the range of the current decryption geographic location; and obtain the original data to be encrypted based on the data query request; use the attribute information of the selected hotspot as the encryption key; encrypt the original data to be encrypted to obtain ciphertext data and send the ciphertext data to the user equipment.

According to the eleventh aspect of the present disclosure, the present disclosure further provides a computing-based device, wherein the computing-based device includes:

a processor; and a memory configured to store computer executable instructions, and the executable instructions are executed to allow the processor to:

receive ciphertext data sent by the network device;

obtain the attribute information of the hotspot scanned within the range of the decryption geographic location; and use the attribute information of the scanned hotspot as the encryption key, and decrypt the ciphertext data to obtain the original data.

According to the twelfth aspect of the present disclosure, the present disclosure further provides a computing-based device, wherein the computing-based device includes:

a processor; and a memory configured to store computer executable instructions, and the executable instructions are executed to allow the processor to:

determine the current actual geographic location as the current decryption geographic location; scan and select the hotspot within the range of the current decryption geographic location; and obtain the attribute information of the selected hotspot;

send the data query request to the network device based on the attribute information of the selected hotspot;

receive the ciphertext data returned by the network device based on the data query request; and use the attribute information of the scanned selected hotspot as the encryption key to decrypt the ciphertext data, and obtain the original data.

Compared with the prior art, the present disclosure includes the following steps: obtaining original data to be encrypted on a network device; determining a decryption geographic location of the original data to be encrypted, and selecting a hotspot within a range of the decryption geographic location; afterwards, using attribute information of the selected hotspot as an encryption key, encrypting the original data to be encrypted to obtain ciphertext data, and sending the ciphertext data to user equipment, wherein the attribute information is available to the user equipment by the user equipment scanning the hotspot within the range of the decryption geographic location. In the present disclosure, the actual decryption geographic location is used as an encryption key of the original data to be encrypted, so as to encrypt the original data. In such a way, the original data is securely sent to the user equipment, which prevents illegal users from cracking the encryption key and obtaining the original data at a different location.

Moreover, after the ciphertext data sent by the network device is received by the user equipment, the present disclosure includes the following steps: obtaining the attribute information of the scanned hotspot within the range of the decryption geographic location; using the attribute information of the scanned hotspot as an encryption key to decrypt the ciphertext data, and obtain the original data. The attribute information of the hotspot obtained based on the actual decryption geographic location is used as the encryption key to decrypt the received ciphertext data, so as to obtain the corresponding original data. Therefore, the security of the original data obtained by the user equipment is ensured, which prevents illegal users from cracking the encryption key and obtaining the original data at a different location.

BRIEF DESCRIPTION OF THE DRAWINGS

Other features, objectives, and advantages of the present disclosure will be clearly illustrated hereinafter with reference to the drawings and the detailed description of the non-limited embodiments.

The same or similar reference numerals in the drawings represent the same or similar units.

DETAILED DESCRIPTION OF THE EMBODIMENTS

The present disclosure will be further described hereinafter with reference to the drawings.

In a typical configuration of the present disclosure, the terminal, the device of the service network, and the trustee each include one or more processors/central processing unit (CPU), an input/output interface, a network interface, and a memory.

The memory includes a volatile memory, a random access memory (RAM), and/or a non-volatile memory in the computer readable media, for example, a read only memory (ROM) or a flash RAM. Memory is an example of the computer readable media.

Computer readable medium includes both non-volatile and volatile media, and removable and non-removable media capable of storing information by any method or technology. The information may be a computer readable instruction, a data structure, a program module, or other data. The computer storage medium includes, but is not limited to, phase change random access memory (PCRAM), static random access memory (SRAM), dynamic random access memory (DRAM), other types of RAM, ROM, electrically erasable programmable read only memory (EEPROM), flash memory or other memory technology, compact disc read only memory (CD-ROM), digital versatile disc (DVD) or other optical memories, cassette magnetic tape, magnetic tape memory or other magnetic memory devices or any other non-transmission media used for storing information capable of being accessed by a computing device. As defined herein, computer readable media excludes transitory computer readable media, such as a modulated data signal and a carrier wave.

Figure 1:
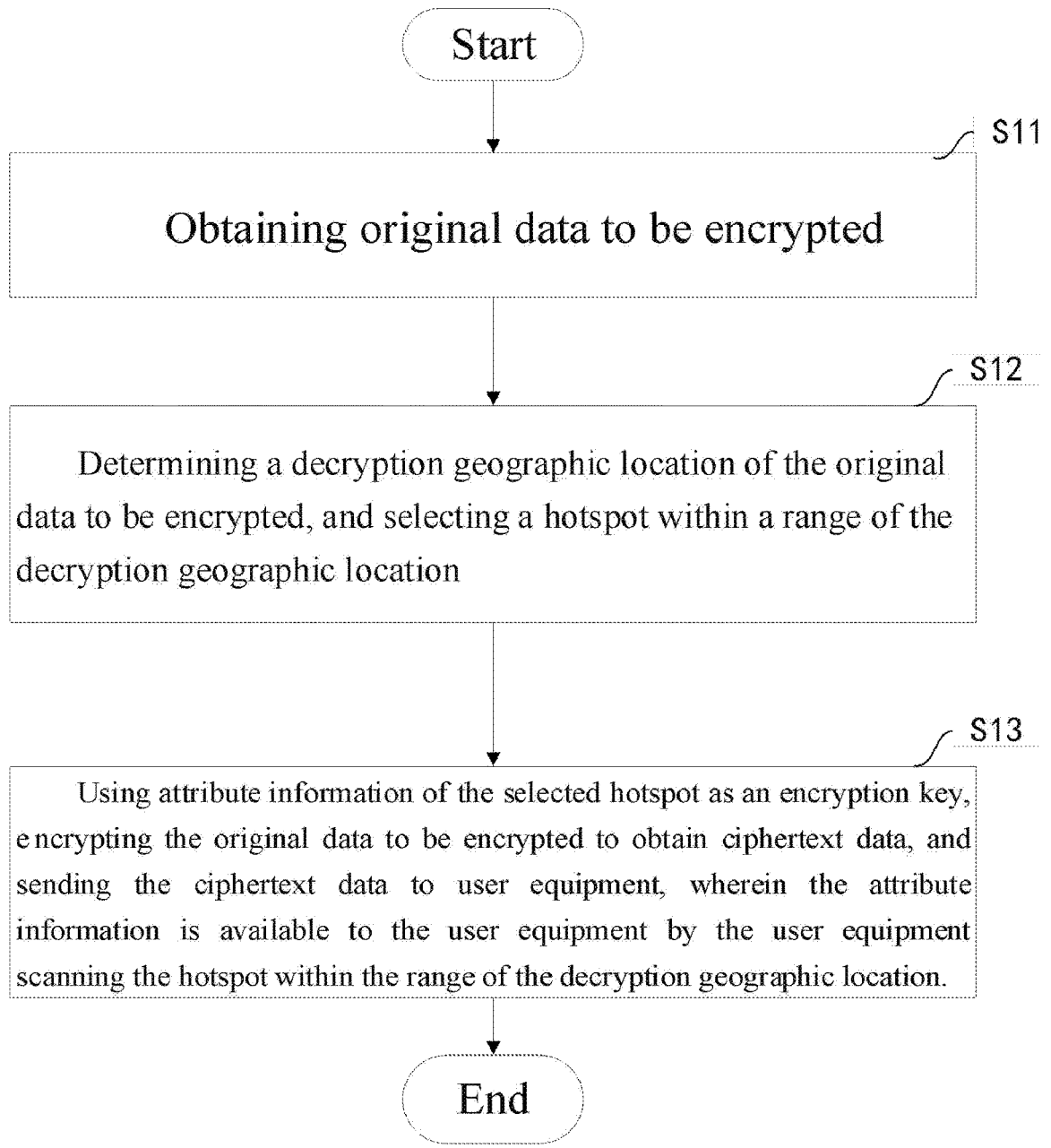
FIG. 1 is a schematic flow diagram of a method for transmitting data on a network device according to the present disclosure.

FIG. 1 is a schematic flow diagram of a method for transmitting data according to an aspect of the present disclosure. The method is applied to the network device in the data transmission process, including step S11, step S12, and step S13. In step S11, the original data to be encrypted is obtained. In step S12, the decryption geographic location of the original data to be encrypted is determined, and the hotspot within the range of the decryption geographic location is selected. In step S13, the attribute information of the selected hotspot is used as the encryption key to encrypt the original data to be encrypted, and the ciphertext data is obtained and sent to the user equipment. Specifically, the attribute information is available to the user equipment by the user equipment scanning the hotspot within the range of the decryption geographic location. In the present disclosure, the actual decryption geographic location is used as an encryption key of the original data to be encrypted, so as to encrypt the original data. Consequently, the original data is securely sent to the user equipment, which prevents illegal users from cracking the encryption key and obtaining the original data at a different location. In an embodiment of the present disclosure, the original data may include at least one of relevant data information of the hotspot; the user attribute information of the user equipment and the business data information stored in the network device. Specifically, the relevant data information of the hotspot may include the hotspot name of the hotspot, the geographic location information of the hotspot, and the provider of the hotspot. The user attribute information of the user equipment may include the user identification information (i.e. the user identification (ID)), a user account, and a password of the user account. The business data information stored in the network device may include a bank card account and a password in the banking service related to the user, or include a member account and a membership information in the member service related to the user. Certainly, it should be understood by those skilled in the art that other original data existing at present or developed in the future for data transmission may be applied to the present disclosure, which would fall within the scope of protection of the present disclosure and is hereby included.

In an embodiment of the present disclosure, the decryption geographic location is an actual geographic location with a longitude and a latitude between the network device and the user equipment in an actual data transmission process. Since at least one hotspot is covered at the actual geographic location, and in order to ensure the uniqueness of the encryption key used for encryption and decryption, a hotspot or a plurality of hotspots may be selected among all hotspots within the range of the actual decryption geographic location. When the plurality of hotspots is selected, the attribute information of the plurality of hotspots must be used as the encryption key at the same time. For example, there are 10 hotspots within the range of the decryption geographic location, which are represented by hotspot 1 to hotspot 10, respectively. If the single hotspot 5 is selected from the 10 hotspots within the range of the decryption geographic location in step S12, the attribute information of the selected hotspot 5 is used as an encryption key in step S13 to encrypt the original data to be encrypted obtained in step S11. If the hotspots 2, 4 and 8 are selected from the 10 hotspots within the range of the decryption geographic location in step S12, the attribute information (basic service set identifier (BSSID 2) of the hotspot 2, the attribute information (BSSID 4) of the hotspot 4, and the attribute information (BSSID 8) of the hotspot 8 are used as an encryption key (i.e. the encryption key is: BSSID 2 and BSSID 4 and BSSID 8) by an "AND" logical relationship, so as to encrypt the original data to be transmitted and to decrypt the encrypted ciphertext data. Therefore, the encryption process of the original data and the decryption process of the encrypted ciphertext data must be achieved at a specific decryption geographic location, thereby ensuring the security of the original data during the data transmission process. Specifically, the attribute information of the selected hotspot may be obtained when the user equipment scans the hotspot in real time, or prestored on the network device. Preferably, the attribute information may include a physical address of the selected hotspot, wherein the physical address (i.e. the media access control (MAC) address) of the selected hotspot in the embodiment of the present disclosure is represented in the form of a BSSID (i.e. the MAC address of the hotspot) obtained by the hotspot in the actual physical address. Preferably, the attribute information includes a physical address of the selected hotspot (i.e. the MAC address) and the user identification information (the user ID) of the user equipment to which the selected hotspot belongs. In this way, the user equipment and the selected hotspot scanned by the user equipment can be determined, thereby ensuring the security and accuracy of transmitting the original data.

In an embodiment of the present disclosure, the encryption key in step S13 is represented by a character string. The encryption key may be a physical address of the selected hotspot, or the attribute information of the selected hotspot, wherein the attribute information must include the physical address of the hotspot for the purpose of ensuring the security of the original data in the data transmission process. Since the actual physical address is used as an encryption key, illegal users at a different location are prevented from decrypting the ciphertext data which is encrypted based on the encryption key. For example, the encryption key used to encrypt the original data to be encrypted may be the physical address (BSSID) of the selected hotspot, or the attribute information (the BSSID and the user ID) of the selected hotspot. The attribute information including the physical address of the hotspot selected within the range of the actual decryption geographic location is used as the encryption key, thereby ensuring the security of data transmission.

Further, the decryption geographic location of the original data to be encrypted is determined in the step S12, specifically including:

a geographic location within the preset distance from a current geographic location of the user equipment is determined as a decryption geographic location of the original data to be encrypted; or a decryption geographic location of the original data to be encrypted is determined according to a historical geographic movement track of the user equipment.

In an embodiment of the present disclosure, since the hotspot has an actual geographic location, when the decryption geographic location of the original data to be encrypted is determined in step S12, the actual geographic location within the preset distance from the current geographic location of the user equipment is determined as the decryption geographic location. The attribute information of the selected hotspot within the range is obtained based on the decryption geographic location. Therefore, after the encrypted ciphertext data is intercepted by the illegal user, the illegal user is unaware of the encryption key (i.e. the attribute information of the hotspot) determined based on the actual decryption geographic location for encryption and decryption, and thus fails to obtain the original data. Alternatively, an actual geographic location where the user equipment may go in the historical geographic movement track can be predicted according to the historical geographic movement track of the user equipment. The user equipment selects the attribute information of a hotspot from all the used hotspots as the encryption key based on the range of the actual geographic location in the historical geographic movement track. The uniqueness and authenticity of the encryption key used for encryption are ensured, thereby ensuring the security of transmitting the original data to be encrypted, and preventing illegal users from stealing the encryption key at a different location and resulting in a leakage of original data.

Further, in step S13, the original data to be encrypted is encrypted to obtain the ciphertext data and the ciphertext data is sent to the user equipment, and in the meantime, a hotspot name corresponding to the selected hotspot is sent to the user equipment.

In an embodiment of the present disclosure, in order to facilitate the user equipment to quickly select a hotspot including the physical address from the hotspots scanned within the range of the decryption geographic location, the encrypted ciphertext data obtained is sent to the user equipment in step S13, and in the meantime the hotspot name (service set identifier (SSID)) corresponding to the selected hotspot which includes the physical address, is sent to the user equipment, so that the user equipment can quickly determine the BSSID corresponding to the hotspot name (SSID) from all the scanned hotspots within the range of the decryption geographic location based on the received hotspot name (SSID). Then, the ciphertext data is quickly decrypted based on the physical address (BSSID) which corresponds to the hotspot name (SSID) and is used as the encryption key, so as to obtain the original data.

Further, in step S13, the attribute information corresponding to the selected hotspot is used as an encryption key, and the original data to be encrypted is encrypted to obtain the ciphertext data and the ciphertext data is sent to the user equipment; specifically including:

The attribute information corresponding to the selected hotspot is used as an encryption key. The original data to be encrypted is encrypted based on the preset encryption algorithm and the encryption key to obtain the ciphertext data, and the ciphertext data is sent to the user equipment.

In an embodiment of the present disclosure, the encryption algorithm may be an advanced encryption standard (AES), or a data encryption standard (DES) or an other equivalent encryption standard. Certainly, it should be understood by those skilled in the art that other encryption algorithm existing at present or developed in the future for encrypting the original data to be encrypted may be applied to the present disclosure, which would fall within the scope of protection of the present disclosure and is hereby included.

In an embodiment of the present disclosure, if the attribute information (e.g. the physical address BSSID and the user ID) corresponding to the selected hotspot is used as an encryption key, and the original data to be encrypted (e.g. the password of the hotspot that the user needs to log in) is encrypted based on the encryption key (the BSSID and the user ID) and the encryption algorithm (e.g. the AES) preset in the data transmission process, then the corresponding ciphertext data is obtained and sent to the user equipment. Thus the encryption process of sending the original data to be encrypted (e.g. the password of the hotspot that the user needs to log in) to the user equipment is obtained. Meanwhile, the security of transmitting the original data to be encrypted to the user equipment (e.g. the password of the hotspot that the user needs to log in) is ensured. Further, only the user equipment corresponding to the user ID is able to decrypt the ciphertext data, so that the original data (e.g. the password of the hotspot that the user needs to log in) is securely and directionally transmitted.

Further, in step S13, the original data to be encrypted is encrypted to obtain the ciphertext data and the ciphertext data is sent to the user equipment, and in the meantime, the preset decryption algorithm is sent to the user equipment.

In an embodiment of the present disclosure, in order to ensure that the received ciphertext data is decrypted quickly and accurately by the user equipment, in step S13, the encrypted ciphertext data is sent to the user equipment, and the preset decryption algorithm is sent to the user equipment in the meantime. In such a way, the user equipment can accurately and quickly decrypt the ciphertext data based on the encryption key obtained at the actual geographic location and the decryption algorithm, wherein the decryption algorithm may be a decryption algorithm symmetric with the encryption algorithm, or a decryption algorithm asymmetric with the encryption algorithm.

Figure 2:
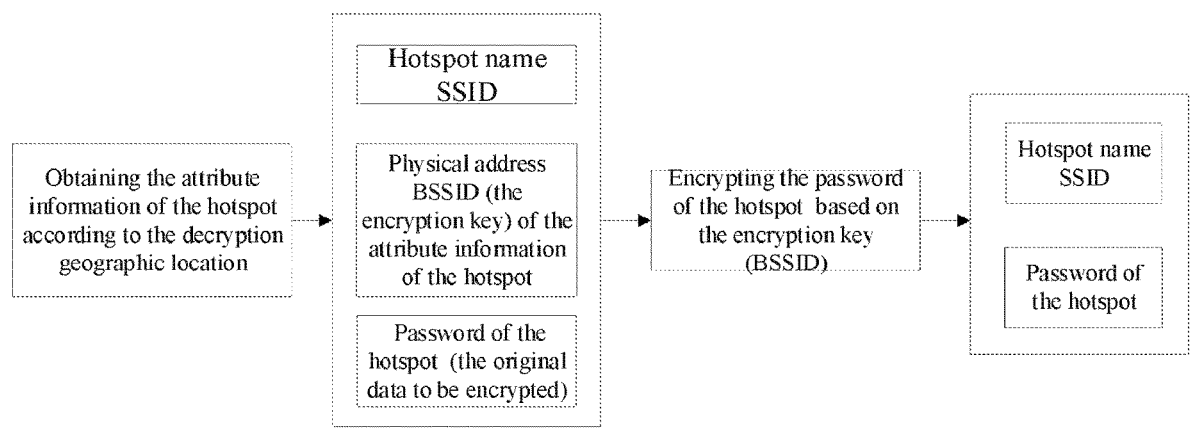
FIG. 2 is a schematic flow diagram showing an actual application scenario for transmitting data on a network device according to the present disclosure.

FIG. 2 shows an actual application scenario of the network device in the data transmission process of the present disclosure. The original data to be encrypted is a hotspot password, and the encryption key is the physical address BSSID of the selected hotspot SSID. First, the hotspot and the corresponding attribute information thereof are obtained by the network device based on the decryption geographic location (e.g. latitude and longitude) of the original data to be encrypted, thereby obtaining the hotspot name SSID, the hotspot password (i.e. the original data to be encrypted), and the encryption key BSSID. Then, the original data to be encrypted (the hotspot password) is encrypted by the network device based on the attribute information BSSID, which is used as the encryption key BSSID, of the hotspot selected within the range of the decryption geographic location, thereby obtaining the encrypted ciphertext data and the corresponding hotspot name SSID. The encrypted ciphertext data obtained is sent to the user equipment. Therefore, the original data (the hotspot password) to be encrypted is encrypted and is securely transmitted. In order to ensure that the user equipment can quickly and accurately select the physical address BSSID corresponding to the hotspot from all hotspots scanned within the range of the decryption geographic location, the network device sends the hotspot name SSID corresponding to the hotspot to the user equipment, so that the user equipment can quickly obtain the BSSID corresponding to the SSID, and thus obtain the encryption key (SSID) for decryption.

When the user equipment needs to obtain the original data of the network device in real time, the user equipment sends a data query request to the network device. Therefore, a method for obtaining data on the network device according to another aspect of the present disclosure is as follows.

First, the network device obtains a data query request sent by the user equipment, wherein the data query request includes the attribute information (e.g. the physical address SSID of the hotspot, alternatively, the physical address SSID of the hotspot and the user identification information of the user equipment to which the hotspot belongs, i.e. the user ID, etc.) of the selected hotspot scanned and obtained by the user equipment within the range of the current decryption geographic location.

After that, the network device obtains the original data to be encrypted that the user equipment needs to obtain in real time based on the data query request. In addition, the attribute information of the selected hotspot is used as the encryption key to encrypt the original data to be encrypted, so as to obtain the ciphertext data.

Finally, the ciphertext data is sent to the user equipment corresponding to the data query request, and the ciphertext data is decrypted based on the encryption key, i.e. the attribute information of the selected hotspot, so as to obtain the original data. Consequently, the user equipment can securely obtain the original data that needs to be queried on the network device in real time, which ensures the security and timeliness of the obtained original data is assured.

Figure 3:
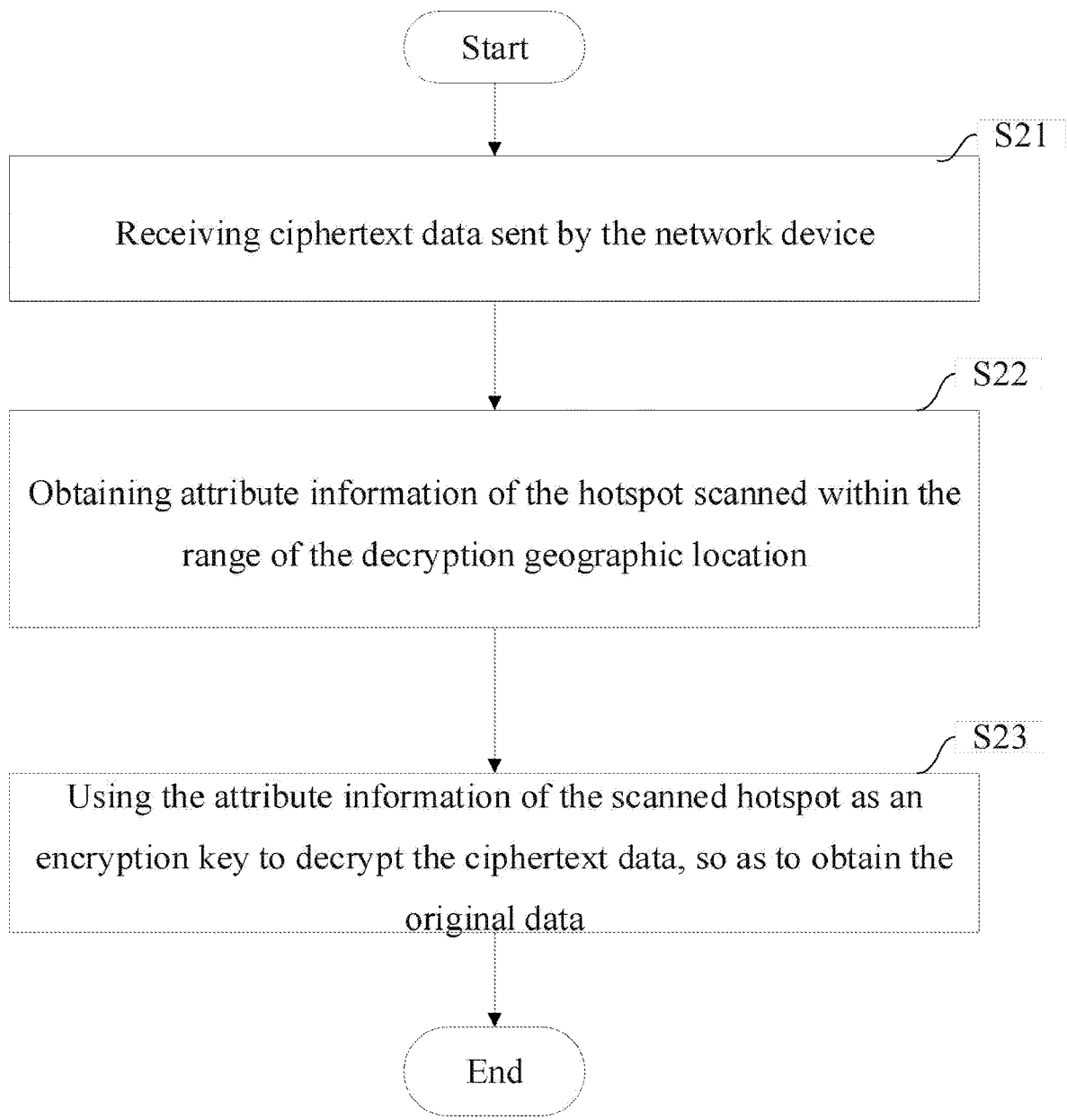
FIG. 3 is a schematic flow diagram of a method for obtaining data on user equipment according to the present disclosure.

FIG. 3 shows a schematic flow diagram of a method for obtaining data on user equipment according to another aspect of the present disclosure. The method is applied to the user equipment in the data transmission process, and includes step S21, step S22, and step S23. In step S21, the ciphertext data sent by the network device is received. Then, in step S22, the attribute information of the hotspot scanned within the range of the decryption geographic location is obtained. After that, in step S23, the attribute information of the scanned hotspot is used as an encryption key to decrypt the ciphertext data, so as to obtain the original data. The attribute information of the hotspot obtained based on the actual decryption geographic location is used as an encryption key to decrypt the received ciphertext data, so as to obtain the corresponding original data. Therefore, the security of the original data to be encrypted obtained by the user equipment is ensured, which prevents illegal users from stealing the original data at a different location.

In an embodiment of the present disclosure, the original data may include at least one of the following: the relevant data information of the hotspot; the user attribute information of the user equipment; the business data information stored in the network device. Specifically, the relevant data information of the hotspot may include a hotspot name of the hotspot, the geographic location information of the hotspot, and the provider of the hotspot. The user attribute information of the user equipment may include the user identification information (i.e. the user ID), a user account, and a password of the user account, etc; and the business data information stored in the network device may include a bank card account and a password thereof in a banking service related to the user, or a member account and membership information in a member service related to the user. Certainly, it should be understood by those skilled in the art that other original data existing at present or developed in the future for data transmission may be applied to the present disclosure, which would fall within the scope of protection of the present disclosure and is hereby included.

Preferably, the attribute information includes a physical address of the selected hotspot, wherein the physical address (i.e. the MAC address) of the selected hotspot in the embodiment of the present disclosure is represented by the BSSID (the MAC address of the hotspot) obtained by the hotspot in the actual physical address.

Further, the decryption geographic location includes:

a geographic location of the user equipment after the user equipment moves the preset distance; and a geographic location in the historical geographic movement track of the user equipment.

In an embodiment of the present disclosure, the decryption geographic location used to obtain the attribute information of the hotspot may be an actual geographic location of the user equipment after the user equipment moves within the preset distance, or an actual geographic location in the historical geographic movement track of the user equipment. In this way, the attribute information of the hotspot can be obtained provided that the user equipment is actually located at the actual decryption geographic location, and then the received ciphertext data is decrypted, thereby ensuring the security of the decryption process of the ciphertext data and the original data corresponding to the ciphertext data decrypted and obtained by the user equipment. Since the illegal user is not able to obtain the actual decryption geographic location, which is used for decryption, of the attribute information of the hotspot, the illegal user cannot reach the actual decryption geographic location to obtain the encryption key (the attribute information of the hotspot), which prevents illegal users at a different location from stealing the ciphertext data and decrypting the ciphertext data.

Further, in step S21, the ciphertext data sent by the network device is received, in the meantime, and meanwhile the hotspot name sent by the network device is received.

In step S23, the attribute information of the scanned hotspot is used as an encryption key, and the ciphertext data is decrypted to obtain the original data, specifically including:

the attribute information corresponding to the hotspot name in the attribute information of the scanned hotspot is used as an encryption key, and the ciphertext data is decrypted to obtain original data.

In an embodiment of the present disclosure, in order to facilitate the user equipment to quickly scan a hotspot including the attribute information of the hotspot from the hotspots scanned within the range of the decryption geographic location, the received hotspot name (SSID) is compared with the attribute information of each the scanned hotspot after the hotspot name (SSID) sent by the network device is received. Then, the attribute information corresponding to the hotspot name (SSID) is obtained, and used as an encryption key to decrypt the received ciphertext data, so as to obtain the original data. The encryption key for decryption is quickly obtained based on the hotspot name (SSID) and the attribute information (e.g. the BSSID, or the BSSID and the user ID, etc.) of the hotspot, thereby realizing fast decryption of the ciphertext data.

Further, in step S23, before the attribute information of the scanned hotspot is used as an encryption key to decrypt the ciphertext data to obtain the original data, the decryption algorithm sent by the network device is received.

In step S23, the attribute information of the scanned hotspot is used as an encryption key, and the ciphertext data is decrypted to obtain the original data, specifically including:

the attribute information of the scanned hotspot is used as an encryption key, and the ciphertext data is decrypted based on the received decryption algorithm and the encryption key, so as to obtain the original data. In an embodiment of the present disclosure, the encryption algorithm may be an inversion algorithm of an advanced encryption standard (AES), or an inversion algorithm of a data encryption standard (DES), or an equivalent encryption standard. Certainly, it should be understood by those skilled in the art that other decryption algorithms existing at present or developed in the future for encrypting the original data may be applied to the present disclosure, which would fall within the scope of protection of the present disclosure and is hereby included.

In an embodiment of the present disclosure, if the attribute information (e.g. the physical address BSSID and the user ID) of the scanned hotspot is used as an encryption key, and the received ciphertext data (e.g. the ciphertext data including the password of the hotspot that the user needs to log in) is decrypted based on the encryption key (the BSSID and the user ID) and the decryption algorithm (e.g. the inversion algorithm of the AES encryption algorithm) received by the user equipment during the data transmission process. Accordingly, the corresponding original data (the password of the hotspot that the user needs to log in) is obtained, so that the user equipment performs a corresponding business process and a response on the user equipment based on the original data (the password of the hotspot that the user needs to log in) obtained by decryption. Therefore, the ciphertext data sent by the network device is decrypted by the user equipment based on the attribute information of the hotspot scanned within the range of the decryption geographic location, so as to obtain the original data that the network device needs to transmit. Moreover, provided that the user equipment actually reaches the decryption geographic location, the attribute information (the encryption key) of the hotspot for decryption can be obtained, and then the ciphertext data is decrypted based on the encryption key. Consequently, the security of the original data (e.g. the password of the hotspot that the user needs to log in) in the data transmission process is ensured.

Figure 4:
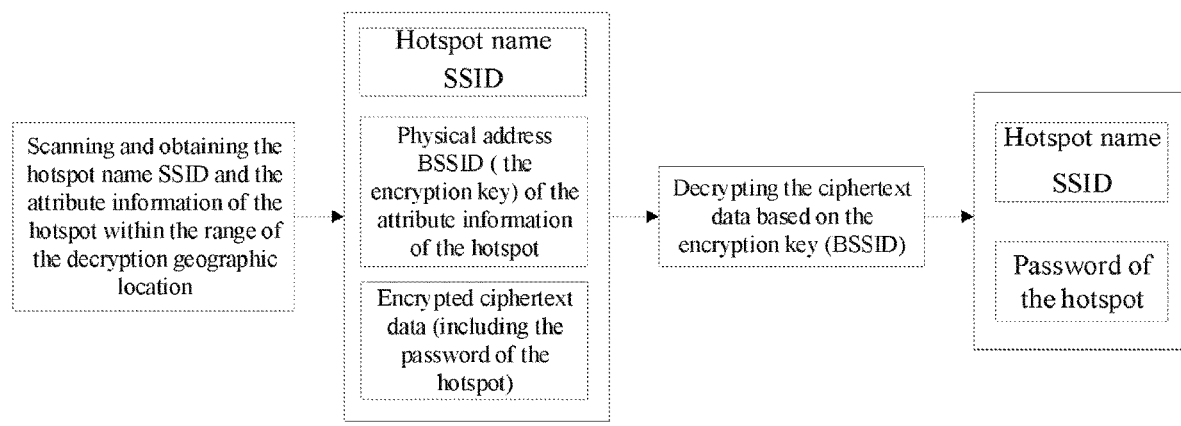
FIG. 4 is a schematic flow diagram showing an actual application scenario for obtaining data on user equipment according to the present disclosure.

FIG. 4 shows an actual application scenario of the user equipment in the data transmission process according to the present disclosure, wherein the ciphertext data includes a hotspot password, and the encryption key is the physical address BSSID of the scanned hotspot. First, the ciphertext data formed by encrypting the hotspot password and the hotspot name SSID of the hotspot are sent by the network device, and are received by the user equipment. Then, the hotspot within the range of the decryption geographic location is scanned based on the received hotspot name SSID to obtain a physical address (BSSID) of the hotspot corresponding to the hotspot name SSID, and the physical address (BSSID) of the corresponding hotspot is used as an encryption key. After that, the ciphertext data is decrypted based on the encryption key (BSSID) and the decryption algorithm to obtain the corresponding original data (the hotspot password). The attribute information of the hotspot obtained based on the actual decryption geographic location is used as the encryption key to decrypt the received ciphertext data, so as to obtain the corresponding original data. Therefore, the security of the original data obtained by the user equipment is ensured, which prevents illegal users from stealing the original data at a different location.

When the user equipment needs to obtain the original data on the network device in real time, a method for obtaining data on the user equipment according to another aspect of the present disclosure is as follows.

First, the user equipment determines the current actual geographic location as the current decryption geographic location, and scans and selects the hotspot within the range of the current decryption geographic location, and obtains the attribute information (e.g. the physical address SSID of the hotspot, alternatively, the physical address SSID of the hotspot and the user identification information of the user equipment to which the hotspot belongs, i.e. the user ID, etc.) of the selected hotspot.

Then, the user equipment sends a data query request to the network device based on the attribute information of the selected hotspot.

After receiving the data query request, the network device obtains the original data to be encrypted that the user equipment needs to obtain in real time. In order to ensure the security of transmitting the original data, the network device uses the attribute information of the selected hotspot as an encryption key to encrypt the original data to be encrypted, and the ciphertext data is obtained and sent to the user equipment.

Afterwards, the user equipment receives the ciphertext data which is returned by the network device based on the data query request.

Finally, the user equipment uses the attribute information of the scanned selected hotspot as an encryption key to decrypt the ciphertext data, and then obtains the original data, thus ensuring the security of the obtained original data and the timeliness of the original data obtained from the network device.

Figure 5:
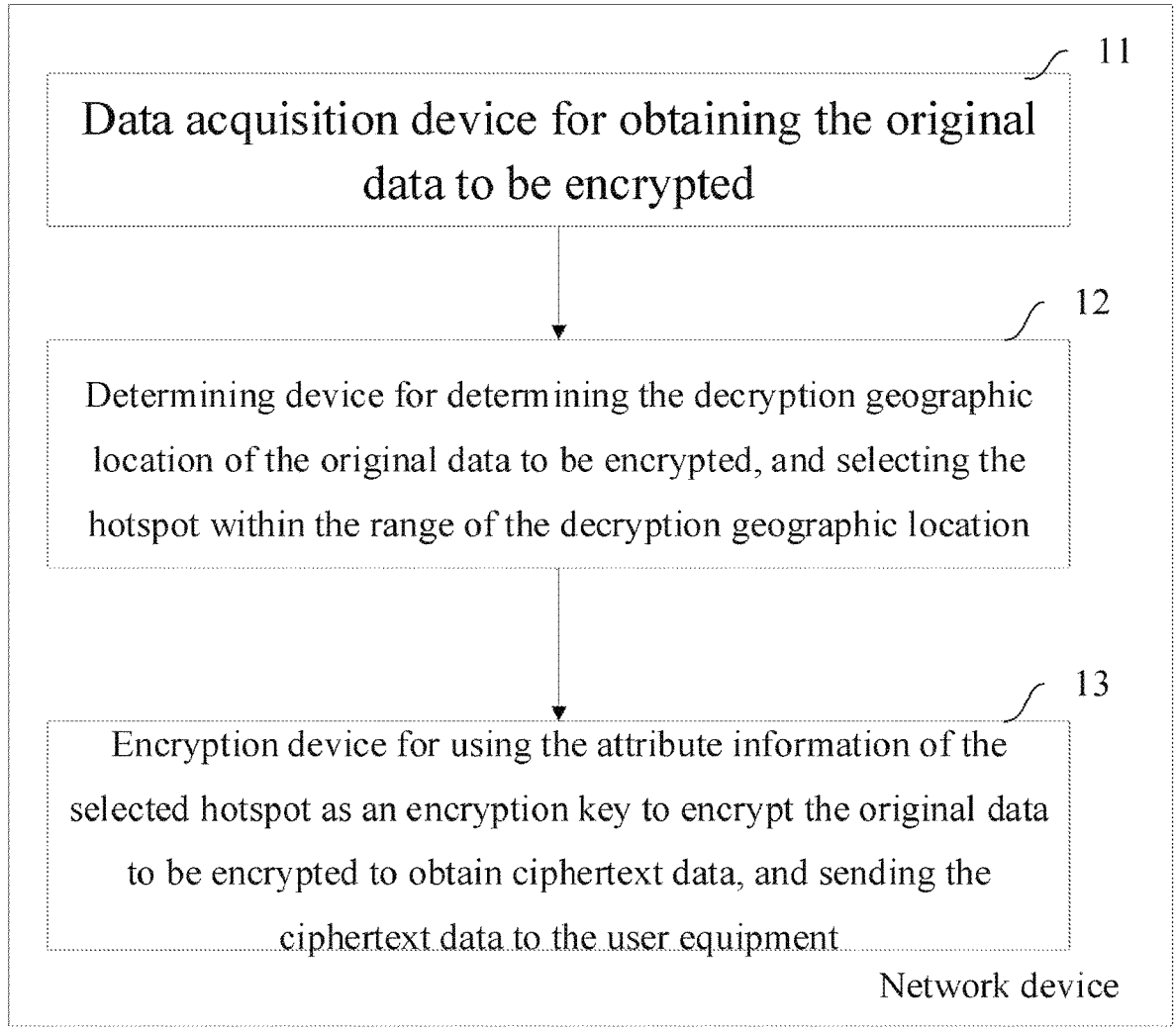
FIG. 5 is a schematic flow diagram of a network device for transmitting data according to the present disclosure.

FIG. 5 shows a schematic flow diagram of a network device for transmitting data according to an aspect of the present disclosure. The network device is applied to the data transmission process, and includes the data acquisition device 11, the determining device 12, and the encryption device 13. Specifically, the data acquisition device 11 is configured to obtain original data to be encrypted. The determining device 12 is configured to determine a decryption geographic location of the original data to be encrypted, and select a hotspot within the range of the decryption geographic location. The encryption device 13 is configured to use the attribute information of the selected hotspot as an encryption key to encrypt the original data to be encrypted, and obtain the ciphertext data and send the ciphertext data to the user equipment. Specifically, the attribute information is available to the user equipment by the user equipment scanning the hotspot within the range of the decryption geographic location. In the present disclosure, the actual decryption geographic location is used as an encryption key of the original data to be encrypted, so as to encrypt the original data. Therefore, the original data is securely sent to the user equipment, which prevents illegal users from cracking the encryption key and obtaining the original data at a different location.

In an embodiment of the present disclosure, the original data may include at least one of the following: the relevant data information of the hotspot; the user attribute information of the user equipment; and the business data information stored in the network device. Specifically, the relevant data information of the hotspot may include the hotspot name of the hotspot, the geographic location information of the hotspot, and the provider of the hotspot. The user attribute information of the user equipment may include the user identification information (i.e. the user ID), the user account, and the password of the user account. The business data information stored in the network device may include the bank card account and the password thereof in a banking service related to the user, or the member account and the membership information in the member service related to the user. Certainly, it should be understood by those skilled in the art that other original data existing at present or developed in the future for data transmission may be applied to the present disclosure, which would fall within the scope of protection of the present disclosure and is hereby included.

In an embodiment of the present disclosure, the decryption geographic location is an actual geographic location with a longitude and a latitude between the network device and the user equipment in the actual data transmission. Since at least one hotspot is covered at the actual geographic location, and in order to ensure the uniqueness of the encryption key used for encryption and decryption, a hotspot or a plurality of hotspots may be selected among all hotspots within the range of the actual decryption geographic location. When the plurality of hotspots is selected, the attribute information of the plurality of hotspots must be used as the encryption key at the same time. For example, there are 10 hotspots within the range of the decryption geographic location, which are represented by hotspot 1 to hotspot 10, respectively. If the single hotspot 5 is selected from the 10 hotspots within the range of the decryption geographic location in step S12, the attribute information of the selected hotspot 5 is used as an encryption key in step S13 to encrypt the original data to be encrypted obtained in step S11. If the hotspots 2, 4 and 8 are selected from the 10 hotspots within the range of the decryption geographic location in step S12, the attribute information (BSSID 2) of the hotspot 2, the attribute information (BSSID 4) of the hotspot 4, and the attribute information (BSSID 8) of the hotspot 8 are used as an encryption key (i.e. the encryption key is: BSSID 2 and BSSID 4 and BSSID 8) by an "AND" logical relationship, so as to encrypt the original data to be transmitted and to decrypt the encrypted ciphertext data. Therefore, the encryption process of the original data and the decryption process of the encrypted ciphertext data must be achieved at a specific decryption geographic location, thereby ensuring the security of the original data during the data transmission process. Specifically, the attribute information of the selected hotspot may be obtained when the user equipment scans the hotspot in real time, or prestored in the network device.

Preferably, the attribute information includes a physical address of the selected hotspot, wherein the physical address (i.e. the MAC address) of the selected hotspot in the embodiment of the present disclosure is represented in the form of a BSSID (i.e. the MAC address of the hotspot) obtained by the hotspot in the actual physical address. Preferably, the attribute information includes the physical address of the selected hotspot (i.e. the MAC address) and the user identification information (the user id) of the user equipment to which the selected hotspot belongs. In this way, the user equipment and the selected hotspot scanned by the user equipment can be determined, thereby ensuring the security and accuracy of transmitting the original data.

In an embodiment of the present disclosure, the encryption key in step S13 is represented by a character string. The encryption key may be a physical address of the selected hotspot, or the attribute information of the selected hotspot, wherein the attribute information must include the physical address of the hotspot for the purpose of ensuring the security of the original data in the data transmission process. The actual physical address is used as an encryption key, so as to prevent illegal users at a different location from decrypting the ciphertext data which is encrypted based on the encryption key. For example, the encryption key used to encrypt the original data to be encrypted may be the physical address (BSSID) of the selected hotspot, or the attribute information (the BSSID and the user ID) of the selected hotspot. The physical address including the hotspot selected within the range of the actual decryption geographic location is authentically used as the encryption key, thereby ensuring the security of the data transmission.

Further, the determining device 12 is configured to:

determine a geographic location within the preset distance from the current geographic location of the user equipment as a decryption geographic location of the original data to be encrypted; or determine a decryption geographic location of the original data to be encrypted according to the historical geographic movement track of the user equipment.

In an embodiment of the present disclosure, since the hotspot has an actual geographic location, when the decryption geographic location of the original data to be encrypted is determined in step S12, the actual geographic location within the preset distance of the current geographic location of the user equipment is determined as the decryption geographic location. The attribute information of the hotspot selected within the range is obtained based on the decryption geographic location. In such a way, the encrypted ciphertext data is intercepted by the illegal user, but the illegal user is not able to obtain the encryption key (i.e. the attribute information of the hotspot) determined based on the actual decryption geographic location for encryption and decryption, and thus cannot obtain the original data. Alternatively, an actual geographic location where the user equipment may go in the historical geographic movement track can be predicted according to the historical geographic movement track of the user equipment. The user equipment selects the attribute information of a hotspot from all the used hotspots as the encryption key based on the range of the actual geographic location in the historical geographic movement track. The uniqueness and authenticity of the encryption key used for encryption and the security of the original data to be encrypted are ensured, which prevents illegal users from stealing the encryption key at a different location and resulting in a leakage of original data.

Further, the encryption device 13 is configured to:

send the hotspot name corresponding to the selected hotspot to the user equipment.

In an embodiment of the present disclosure, in order to facilitate the user equipment to quickly select a hotspot including the physical address from the hotspots scanned within the range of the decryption geographic location, the encrypted ciphertext data is transmitted to the user equipment by the encryption device 13, and in the meantime, the hotspot name (SSID) corresponding to the selected hotspot including the physical address is sent to the user equipment, so that the user equipment can quickly determine the BSSID corresponding to the hotspot name (SSID) from all the scanned hotspots within the range of the decryption geographic location based on the received hotspot name (SSID). After that, the ciphertext data is quickly decrypted based on the encryption key, i.e. the physical address (BSSID) corresponding to the hotspot name (SSID), so as to obtain the original data.

Further, the encryption device 13 is configured to:

use the attribute information corresponding to the selected hotspot as an encryption key, encrypt the original data to be encrypted based on the preset encryption algorithm and the encryption key to obtain the ciphertext data, and send the ciphertext data to the user equipment.

In an embodiment of the present disclosure, the encryption algorithm includes AES and DES. Certainly, it should be understood by those skilled in the art that other encryption algorithms existing at present or developed in the future for encrypting the original data may be applied to the present disclosure, which would fall within the scope of protection of the present disclosure and is hereby included.

In an embodiment of the present disclosure, the attribute information (e.g. the physical address BSSID and the user ID) corresponding to the selected hotspot is used as an encryption key, and the original data to be encrypted (e.g. the password of the hotspot that the user needs to log in) is encrypted based on the encryption key (the BSSID and the user ID) and the encryption algorithm (e.g. the AES) preset in the data transmission process. Then, the corresponding ciphertext data is obtained and sent to the user equipment. Consequently, the original data to be encrypted (e.g. the password of the hotspot that the user needs to log in) that needs to be sent to the user equipment is encrypted, thereby ensuring the security of transmitting the original data to be encrypted (e.g. the password of the hotspot that the user needs to log in) to the user equipment. Further, only the user equipment corresponding to the user ID is able to decrypt the ciphertext data, so that the original data (e.g. the password of the hotspot that the user needs to log in) is securely and directionally transmitted.

Further, the encryption device 13 is configured to:

send the preset decryption algorithm to the user equipment.

In an embodiment of the present disclosure, in order to ensure that the received ciphertext data is quickly and accurately decrypted by the user equipment, the encryption device 13 sends the ciphertext data obtained by encryption to the user equipment, and sends the preset decryption algorithm to the user equipment at the same time. In such a way, the user equipment can accurately and quickly decrypt the ciphertext data based on the encryption key obtained at the actual geographic location and the decryption algorithm, wherein the decryption algorithm may be a decryption algorithm symmetric with the encryption algorithm, or a decryption algorithm asymmetric with the encryption algorithm.

FIG. 2 shows an actual application scenario of the network device in the data transmission process of the present disclosure. The original data to be encrypted is a hotspot password, and the encryption key is the physical address BSSID of the selected hotspot SSID. First, the hotspot and the corresponding attribute information thereof are obtained by the network device based on the decryption geographic location (e.g. the latitude and the longitude) of the original data to be encrypted. The hotspot name SSID, the hotspot password, i.e. the original data to be encrypted, and the encryption key BSSID are obtained. Then, the original data to be encrypted (the hotspot password) is encrypted by the network device based on the attribute information BSSID, which is used as the encryption key BSSID, of the hotspot selected with the range of the decryption geographic location. The encrypted ciphertext data and the corresponding hotspot name SSID are obtained, and the obtained encrypted ciphertext data is sent to the user equipment. Therefore, the original data to be encrypted (the hotspot password) is encrypted and is securely transmitted. In order to ensure that the user equipment can quickly and accurately select the physical address BSSID corresponding to the hotspot from all hotspots scanned within the range of the decryption geographic location, the network device sends the hotspot name SSID corresponding to the hotspot to the user equipment, so that the user equipment can quickly obtain the BSSID corresponding to the SSID, and thus obtain the encryption key (SSID) for decryption.

When the user equipment needs to obtain the original data of the network device in real time, the user equipment sends a data query request to the network device. The network device for transmitting data according to another aspect of the present disclosure specifically includes:

the request acquisition device, configured to obtain the data query request sent by the user equipment, wherein the data query request includes the attribute information (e.g. the physical address SSID of the hotspot, alternatively, the physical address SSID of the hotspot and the user identification information of the user equipment to which the hotspot belongs, i.e. the user ID, etc.) of the selected hotspot scanned and obtained by the user equipment within the range of the current decryption geographic location; and the ciphertext data transmitting device, configured to obtain the original data to be encrypted that the user equipment needs to obtain in real time based on the data query request; use the attribute information of the selected hotspot as the encryption key to encrypt the original data to be encrypted and obtain the ciphertext data; and send the ciphertext data to the user equipment corresponding to the data query request. Therefore, the ciphertext data is decrypted by the user equipment based on the attribute information, which is used as the encryption key, of the selected hotspot to obtain the original data, so that the user equipment can securely obtain the original data that needs to be queried on the network device in real time, and ensure the security and timeliness of the obtained original data.

Figure 6:
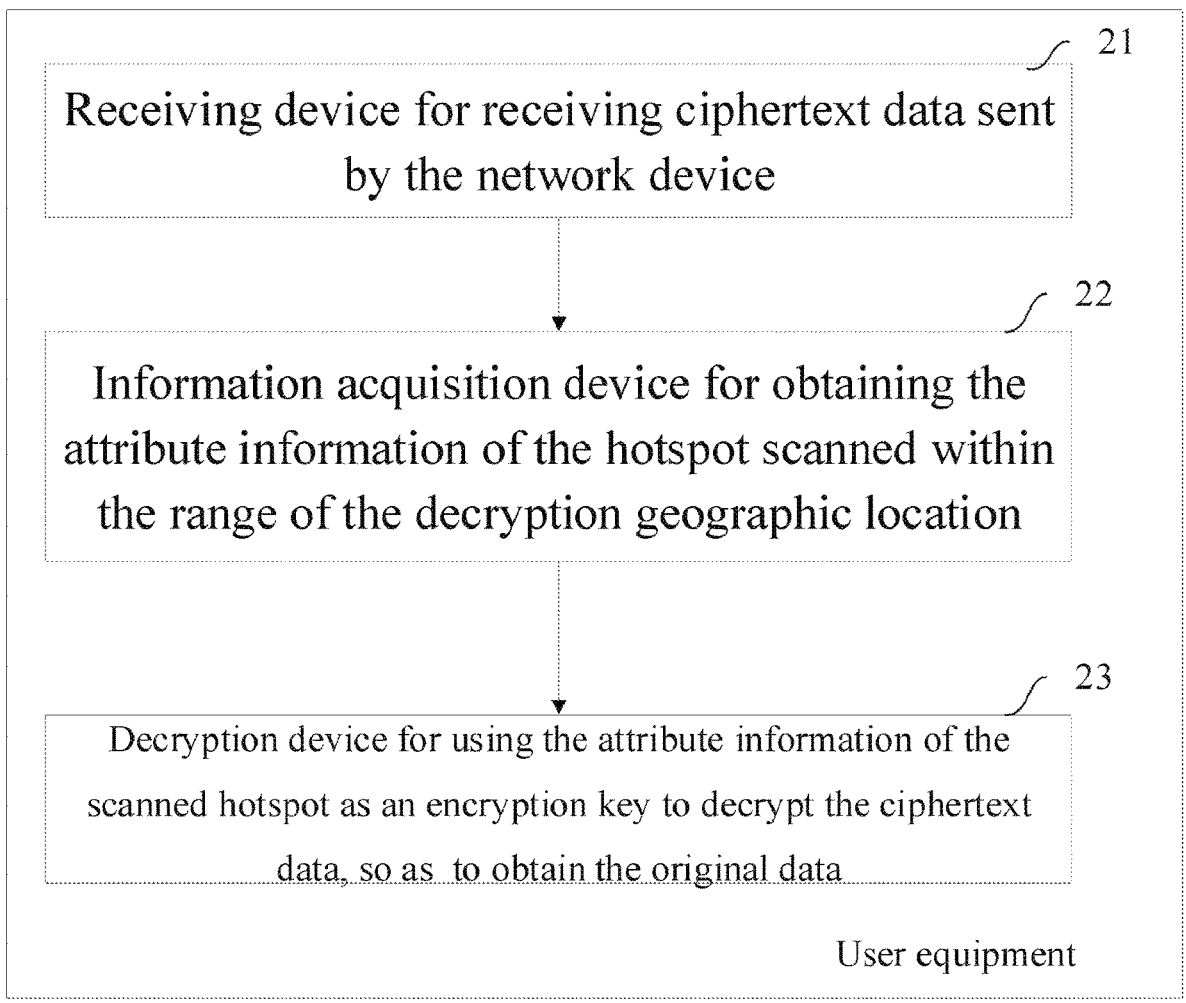
FIG. 6 is a schematic flow diagram of user equipment for obtaining data according to the present disclosure.

FIG. 6 shows a schematic flow diagram of the user equipment for obtaining data according to another aspect of the present disclosure. The user equipment is applied to the data transmission process, and includes the receiving device 21, the information acquisition device 22, and the decryption device 23. The receiving device 21 is configured to receive the ciphertext data sent by the network device. The information acquisition device 22 is configured to obtain the attribute information of the hotspot scanned within the range of the decryption geographic location. The decrypting device 23 is configured to use the attribute information of the scanned hotspot as an encryption key to decrypt the ciphertext data, so as to obtain the original data. The attribute information of the hotspot obtained based on the actual decryption geographic location is used as the encryption key to decrypt the received ciphertext data, so as to obtain the corresponding original data. Therefore, the security of the original data obtained by the user equipment is ensured, which prevents illegal users from stealing the original data at a different location.

In an embodiment of the present disclosure, the original data may include at least one of the following: the relevant data information of the hotspot; the user attribute information of the user equipment; and the business data information stored in the network device. Specifically, the relevant data information of the hotspot may include the hotspot name of the hotspot, the geographic location information of the hotspot, and the provider of the hotspot. The user attribute information of the user equipment may include the user identification information (i.e. the user ID), the user account, and the password of the user account etc. The business data information stored in the network device may include the bank card account and the password thereof in a banking service related to the user, or the member account and the membership information in the member service related to the user. Certainly, it should be understood by those skilled in the art that other original data existing at present or developed in the future for data transmission may be applied to the present disclosure, which would fall within the scope of protection of the present disclosure and is hereby included.

Preferably, the attribute information includes a physical address of the selected hotspot, wherein the physical address (i.e. the MAC address) of the selected hotspot in the embodiment of the present disclosure is represented in the form of a BSSID (i.e. the MAC address of the hotspot) obtained by the hotspot in the actual physical address. Preferably, the attribute information may also include the physical address of the selected hotspot (i.e. the MAC address) and the user identification information (the user ID) of the user equipment to which the selected hotspot belongs. Consequently, the user equipment and the selected hotspot scanned by the user equipment are determined, so as to ensure that the original data, which is obtained after the transmitted ciphertext data is decrypted, is accurately and securely obtained by the user equipment.

Further, the decryption geographic location includes:

a geographic location of the user equipment after the user equipment moves the preset distance; and a geographic location in the historical geographic movement track of the user equipment.

In an embodiment of the present disclosure, the decryption geographic location used to obtain the attribute information of the hotspot may be an actual geographic location of the user equipment after the user equipment moves within the preset distance, or an actual geographic location in the historical geographic movement track of the user equipment. In this way, the attribute information of the hotspot can be obtained provided that the user equipment is actually located at the actual decryption geographic location, and then the received ciphertext data is decrypted, thereby ensuring the security of the decryption process of the ciphertext data and the corresponding original data after the ciphertext data is decrypted and obtained by the user equipment. Since the illegal user is not able to obtain the actual decryption geographic location of the attribute information of the hotspot for decryption, the illegal user cannot reach the actual decryption geographic location to obtain the encryption key (the attribute information of the hotspot), which prevents illegal users from obtaining the ciphertext data at a different location and decrypting the ciphertext data.

Further, the receiving device 21 is configured to:

receive the hotspot name sent by the network device.

The decryption device 23 is configured to:

use the attribute information corresponding to the hotspot name in the attribute information of the scanned hotspot as an encryption key, and decrypt the ciphertext data to obtain the original data.

In an embodiment of the present disclosure, in order to facilitate the user equipment to quickly scan a hotspot including the attribute information of the hotspot from the scanned hotspots within the range of the decryption geographic location, after the hotspot name (SSID) sent by the network device is received, the received hotspot name (SSID) is compared with the attribute information of each scanned hotspot. Then, the attribute information corresponding to the hotspot name (SSID) is obtained and used as an encryption key to decrypt the received ciphertext data, so as to obtain the original data. The encryption key for decryption is quickly obtained based on the hotspot name (SSID) and the attribute information (e.g. the BSSID, or the BSSID and the user ID, etc.) of the hotspot, thereby realizing fast decryption of the ciphertext data.

Further, the decryption device 23 is configured to:

receive the decryption algorithm sent by the network device.

The decryption device 23 configured to use the attribute information of the scanned hotspot as an encryption key, and decrypt the ciphertext data to obtain the original data, is specifically configured to:

use the attribute information of the scanned hotspot as an encryption key, and decrypt the ciphertext data based on the received decryption algorithm and the encryption key to obtain the original data. In an embodiment of the present disclosure, the encryption algorithm may be an inversion algorithm of an AES, or an inversion algorithm of a DES. Certainly, it should be understood by those skilled in the art that other encryption algorithm existing at present or developed in the future for encrypting the original data may be applied to the present disclosure, which would fall within the scope of protection of the present disclosure and is hereby included.

In an embodiment of the present disclosure, the attribute information (e.g. the physical address BSSID and the user ID) of the scanned hotspot is used as an encryption key, and the received ciphertext data (e.g. the ciphertext data including the password of the hotspot that the user needs to log in) is decrypted based on the encryption key (the BSSID and the user ID) and the decryption algorithm (e.g. the inversion algorithm of the AES encryption algorithm) received by the user equipment in the data transmission process. Then, the corresponding original data (the password of the hotspot that the user needs to log in) is obtained, so that the user equipment performs a corresponding business process and a response on the user equipment based on the original data (the password of the hotspot that the user needs to log in) obtained by decryption. Therefore, the user equipment decrypts the ciphertext data sent by the network device based on the attribute information of the hotspot scanned within the range of the decryption geographic location, so as to obtain the original data that the network device needs to transmit. In addition, since the attribute information (the encryption key) of the hotspot for decryption can be obtained provided that the user equipment actually reaches the decryption geographic location, and then the ciphertext data is decrypted based on the encryption key, thereby ensuring the security of the original data (e.g. the password of the hotspot that the user needs to log in) in the data transmission process.

FIG. 4 shows an actual application scenario of the user equipment in the data transmission process according to the present disclosure. The ciphertext data includes a hotspot password, and the encryption key is the physical address BSSID of the scanned hotspot. First, the ciphertext data having the encrypted hotspot password and the hotspot name SSID of the hotspot sent by the network device are received by the user equipment. Then, the user equipment scans the hotspot within the range of the decryption geographic location based on the received hotspot name SSID to obtain a physical address (BSSID) of the hotspot corresponding to the hotspot name SSID, and the physical address (BSSID) of the corresponding hotspot is used as an encryption key. After that, the ciphertext data is decrypted based on the encryption key (BSSID) and the decryption algorithm to obtain the corresponding original data (the hotspot password). The attribute information of the hotspot obtained based on the actual decryption geographic location is used as the encryption key to decrypt the received ciphertext data, so as to obtain the corresponding original data. Therefore, the security of the original data obtained by the user equipment is ensured, which prevents illegal users from stealing the original data at a different location.

When the user equipment needs to obtain the original data of the network device in real time, user equipment for obtaining data according to another aspect of the present disclosure specifically includes:

the determining acquisition device, configured to determine the current actual geographic location as the current decryption geographic location; scan and select the hotspot within the range of the current decryption geographic location; and obtain the attribute information (e.g. the physical address SSID of the hotspot, alternatively, the physical address SSID of the hotspot, and the user identification information of the user equipment to which the hotspot belongs, i.e. the user ID, etc.) of the selected hotspot;

the request transmitting device, configured to send the data query request to the network device based on the attribute information of the selected hotspot; wherein after the data query request is received by the network device, the original data to be encrypted that the user equipment needs to obtain in real time is obtained; in order to ensure the security of the transmitted original data, the network device uses the attribute information of the selected hotspot as an encryption key to encrypt the original data to be encrypted, and the ciphertext data is obtained and sent to the user equipment;

the ciphertext data receiving device, configured to receive the ciphertext data returned by the network device based on the data query request; and the decryption acquisition device, configured to use the attribute information of the scanned selected hotspot as an encryption key to decrypt the ciphertext data, so as to obtain the original data. Therefore, the security of the obtained original data and the timeliness of obtaining the original data from the network device are ensured.

In conclusion, the present disclosure employs the following steps. First, the original data to be encrypted is obtained by a network device. Then, a decryption geographic location of the original data to be encrypted is determined, and a hotspot within a range of the decryption geographic location is selected. After that, the attribute information of the selected hotspot is used as an encryption key to encrypt the original data to be encrypted, and the ciphertext data is obtained and sent to the user equipment, wherein the attribute information is available to the user equipment by the user equipment scanning the hotspot within the range of the decryption geographic location. The present disclosure realizes the encryption of the original data based on the actual decryption geographic location which is used as an encryption key of the original data to be encrypted. Therefore, the original data is securely sent to the user equipment, which prevents illegal users from cracking the encryption key and obtaining the original data at a different location.

Further, after the user equipment receives the ciphertext data sent by the network device, the attribute information of the scanned hotspot is obtained within the range of the decryption geographic location. Then, the attribute information of the scanned hotspot is used as an encryption key to decrypt the ciphertext data, so as to obtain the original data. The attribute information of the hotspot obtained based on the actual decryption geographic location is used as the encryption key to encrypt the received ciphertext data, so as to obtain the corresponding original data. Therefore, the security of the original data obtained by the user equipment is ensured, which prevents illegal users from stealing the original data at a different location.

It should be noted that the present disclosure can be implemented by software and/or a combination of software and hardware. For example, the present disclosure can be achieved by using an application specific integrated circuit (ASIC), a general-purpose computer, or any other similar hardware device. In one embodiment, the software program of the present disclosure can be executed by a processor to achieve the steps or functions described above. Similarly, the software program (including a related data structure) of the present disclosure can be stored in a computer readable recording media, e.g. RAM, a magnetic drive or an optical drive, or a floppy disk and other similar devices. In addition, some of the steps or functions of the present disclosure may be achieved by hardware. For example, the circuit cooperates with the processor to perform the various steps or functions.

Additionally, a part of the present disclosure can be applied to a computer program product, e.g. a computer program instruction. When the computer program instruction is executed by a computer, the method and/or technical solution according to the present disclosure can be called or provided by an operation of the computer. Moreover, the program instructions that call the method of the present disclosure may be stored in a stationary or removable recording medium, and/or transmitted by a data stream in a broadcast or other signal carrying media, and/or stored in a working memory of a computer device operating in accordance with the program instructions. Herein, an embodiment according to the present disclosure includes a device or device. The device includes a memory for storing computer program instructions and a processor for executing program instructions, wherein when the computer program instructions are executed by the processor, the device is triggered to operate the methods and/or technical solutions described above according to the various embodiments of the present disclosure.

The present disclosure is certainly not limited to the details of the above-mentioned illustrative embodiments for those skilled in the art. Moreover, the present disclosure can be realized in other specific forms without departing from the spirit or essential features of the present disclosure. The embodiments should be considered illustrative and non-limited. The scope of the present disclosure is defined by the claims rather than the above-mentioned description. Therefore, all changes falling within the implication and scope of equivalents of the claims are intended to be included in the present disclosure. Any reference numerals in the claims should not be considered to limit the related claim(s). In addition, the terminology "include" does not exclude other units or steps, and the singular situation does not exclude the plural situations. The plurality of units or devices described in the claims may also be achieved by a unit or a device in the manner of software or hardware. The terminologies "first", "second", and the like are used to represent designations, which are not intended to indicate any specific sequence or sequences.

What is claimed is:

1. A method for transmitting data on a network device, comprising:
   obtaining original data to be encrypted;
   a step of determining a decryption geographic location of the original data to be encrypted, and selecting a hotspot within a range of the decryption geographic location; wherein the step of determining the decryption geographic location of the original data to be encrypted comprises:
   determining a geographic location within a preset distance from a current geographic location of the user equipment as the decryption geographic location of the original data to be encrypted and determining the decryption geographic location of the original data to be encrypted according to a historical geographic movement track of the user equipment; and
   a step of using attribute information of the hotspot as an encryption key, encrypting the original data to be encrypted to obtain ciphertext data, and sending the ciphertext data to user equipment, wherein the attribute information is available to the user equipment by the user equipment scanning the hotspot within the range of the decryption geographic location,
   wherein the original data may include at least one of relevant data information of the hotspot, user attribute information of the user equipment, or business data information stored in the network device, and wherein the business data stored in the network device may include at least one of a bank card account related to a user, a password in a banking service related to a user, a member account in a member service related to a user, or membership information in a member service related to a user.

2. The method according to claim 1, wherein the attribute information comprises a physical address of the hotspot.

3. The method according to claim 1, wherein the attribute information comprises a physical address of the hotspot and user identification information of the user equipment, wherein the hotspot belongs to the user equipment.

4. The method according to claim 1, wherein when the original data to be encrypted is encrypted to obtain the ciphertext data and the ciphertext data is sent to the user equipment, the method further comprises:
   sending a hotspot name corresponding to the hotspot to the user equipment.

5. The method according to claim 1, wherein the step of using the attribute information of the hotspot as an encryption key, encrypting the original data to be encrypted to obtain the ciphertext data, and sending the ciphertext data to the user equipment, comprises:
   using the attribute information corresponding to the hotspot as the encryption key, encrypting the original data to be encrypted based on a preset encryption algorithm and the encryption key to obtain the ciphertext data, and sending the ciphertext data to the user equipment.

6. The method according to claim 1, wherein the original data comprises at least one of the following:
   relevant data information of the hotspot;
   user attribute information of the user equipment; and
   business data information stored in the network device.

7. The method according to claim 1, wherein when the original data to be encrypted is encrypted to obtain the ciphertext data and the ciphertext data is sent to the user equipment, the method further comprises:
   sending a preset decryption algorithm to the user equipment.

8. A method for obtaining data on user equipment, comprising:
   a step of determining a current actual geographic location as a current decryption geographic location, scanning and selecting a hotspot within a range of the current decryption geographic location, and obtaining attribute information of the hotspot;

sending a data query request to a network device based on the attribute information of the hotspot;

receiving ciphertext data returned by the network device based on the data query request; and a step of using the attribute information of the hotspot as an encryption key and decrypting the ciphertext data to obtain original data, wherein the attribute information comprises a physical address of the hotspot and the original data may include at least one of relevant data information of the hotspot, user attribute information of the user equipment, or business data information stored in the network device, and wherein the business data stored in the network device may include at least one of a bank card account related to a user, a password in a banking service related to a user, a member account in a member service related to a user, or membership information in a member service related to a user.

9. The method according to claim 1, wherein the relevant data information of the hotspot may include at least one of a hotspot name of the hotspot, a geographic location information of the hotspot, or a provider of the hotspot.

10. The method according to claim 1, wherein the user attribute information of the user equipment may include user identification information of a user account.

* * * * *